United States Patent [19]
Roach, Jr.

[11] Patent Number: 6,018,577
[45] Date of Patent: Jan. 25, 2000

[54] DATA MESSAGING METHOD

[76] Inventor: Peter Owen Roach, Jr., 8546 Lurry La., Cordova, Tenn. 38018

[21] Appl. No.: 08/903,860

[22] Filed: Jul. 31, 1997

[51] Int. Cl.$^7$ .............................. H04M 7/00; H04M 1/56
[52] U.S. Cl. ........................... 379/229; 379/142; 379/201
[58] Field of Search ..................................... 379/229, 230, 379/231, 234, 142, 215, 93.35, 201, 207

[56] References Cited

U.S. PATENT DOCUMENTS

| | | | |
|---|---|---|---|
| 5,287,401 | 2/1994 | Lin ........................................... | 379/215 |
| 5,572,578 | 11/1996 | Lin et al. ................................. | 379/207 |
| 5,802,166 | 9/1998 | Garcia et al. ........................... | 379/142 |
| 5,852,657 | 12/1998 | Malik et al. ............................. | 379/201 |

*Primary Examiner*—Krista Zele
*Assistant Examiner*—Benny Q. Tieu
*Attorney, Agent, or Firm*—Gardner & Groff, P.C.

[57] ABSTRACT

A data messaging method for communicating a short data message between a message sender and a message recipient using the existing facilities and capabilities of the public switched telecommunication network and without establishing a telephonic connection therebetween, thereby reducing the time and cost required to communicate a data message between the parties as compared to current methods. In a preferred embodiment, the method communicates a user-definable data message between a message sender having telephone terminal equipment and a plurality of telephone lines associated therewith, and a message recipient having telephone terminal equipment and a telephone line associated therewith. According to the method, a first plurality of data message portions are associated in one-to-one correspondence with the message sender's plurality of telephone lines. The data message is then parsed into a second plurality of data message portions taken from the first plurality of data message portions. The second plurality of data message portions are communicated to the message recipient by initiating successive telephone calls to the message recipient's telephone line on message sender telephone lines which are selected for their respective association with data message portions of the first plurality of data message portions that match the data message portions of the second plurality of data message portions. Upon receiving information identifying the message sender telephone lines from a calling party identification service, the data message portions of the first plurality of data message portions corresponding to the selected telephone lines are determined and presented to the message recipient.

17 Claims, 10 Drawing Sheets

162 → SEND = 901-755-7001 ← 98a
164 → FIRE = 901-755-7002 ← 98b
POLICE = 901-755-7003 ← 98c
166 → DEPT. = 901-755-7004 ← 98d

DATA MESSAGING METHOD

FIELD OF THE INVENTION

This invention relates generally to the field of telecommunications, and in its preferred and alternate embodiments, to methods of communicating short data messages.

BACKGROUND OF THE INVENTION

Individuals and data communication devices often need to communicate very short data messages to another respective party or data communication device. Unfortunately, in today's telecommunication environment, there is generally no cost effective method available for communicating such data messages from one individual or data communication device to another. For example, to pass such a data message over an existing analog telephone line, a connection must be made between two endpoints in order for a communication session to be established and then, some sort of signaling method employing modems or touch tones might be utilized to communicate the data message. Depending on the location of the endpoints, the telecommunication companies which provide the necessary connection may apply local connection charges and long distance charges for the communication session. In some cases, certain telecommunication companies charge higher rates for the first minute of use than for subsequent minutes of use and may round charges upward to the next minute increment, thereby increasing the cost associated with sending a very short data message. As alternatives to using analog lines with modems or touch tones, ISDN D-channel messaging or dedicated lines might be employed to communicate such data messages. Unfortunately, both of these alternatives are often cost prohibitive and may not be available in many locations, thereby rendering their usage impractical.

In addition to the general failure of today's telecommunication environment to provide a cost effective method for communicating very short data messages, the telecommunication environment has also failed to provide a fast method of communicating short data messages utilizing analog telephone lines and inexpensive communication devices or services. This failure to provide a fast communication method for short data messages can be of great consequence to owners of buildings and homes who protect their property with fire and/or burglar alarm systems which are capable of contacting fire and/or police departments in the event that a fire and/or unauthorized entry occurs to their building or home. Such fire and/or burglar alarm systems typically incorporate a controller which detects a fire and/or unauthorized entry by monitoring data from sensors strategically positioned about a building or home and which subsequently establishes a communication session with a fire and/or police department (or, with an alarm monitoring service) to signal the presence of a fire or an intruder. In most cases, the controller establishes the communication session utilizing analog telephone lines and a modem, or similar communication device, and then communicates an appropriate signal (i.e., indicating the presence of a fire or of a burglar), via the modem or communication device, to a receiving modem, or similar communication device located at the fire and/or police department (or, at the monitoring service provider's site). The establishment of such a communication session can require up to thirty (30) seconds for initialization alone. In the meantime, precious property may be destroyed by fire or stolen by a burglar.

There is, therefore, a need in the telecommunication industry for a fast, cost effective method of communicating a short data message between parties or communication devices, and which can solve other related and unrelated problems that become apparent upon reading and understanding this specification.

SUMMARY OF THE INVENTION

Briefly described, the present invention comprises a data messaging method for communicating a short data message between a message sender (also referred to herein as a "calling party" or "first party"), and a message recipient (also referred to herein as a "called party" or "second party") using the existing facilities and capabilities of the public switched telecommunication network and without establishing a telephone connection therebetween, thereby reducing the time and cost required to send a data message between the parties when compared to current methods. In a preferred embodiment, the present invention comprises a method of communicating a user-definable data message between a first party having telephone terminal equipment at a first party site and a plurality of telephone lines associated therewith, and a second party having telephone terminal equipment at a second party site and a telephone line associated therewith. The telephone lines of the first and second parties are selectively connectable for communication therebetween using the facilities of the public switched telecommunication network. The method comprises the steps of associating a first plurality of data message portions in one-to-one correspondence with the first party's plurality of telephone lines and parsing the data message into a second plurality of data message portions which include data message portions of the first plurality of data message portions. For each data message portion of the second plurality of data message portions, the method further comprises the steps of: selecting a telephone line of the first party's plurality of telephone lines where the selected telephone line is associated with a data message portion of the first plurality of data message portions which matches the data message portion of the second plurality of data message portions; initiating a telephone call to the second party's telephone line employing the selected telephone line; receiving from the public switched telecommunication network information identifying the selected telephone line; and, determining the data message portion of the first plurality of data message portions corresponding to the selected telephone line using, at least, the information identifying the selected telephone line. The performance of the steps of receiving and determining occur absent answering of the telephone call by the second party.

Preferably, the method comprises a step of presenting the data message portion so determined to the second party and a step of storing, in a data storage device, information representing the one-to-one associations of the data message portions of the first plurality of data message portions with the first party's plurality of telephone lines. The step of determining preferably includes a step of retrieving, from the data storage device, the data message portion of the first plurality of data message portions based upon, at least, the information identifying the selected telephone line of the first party.

Also preferably, the method further comprises a step of ensuring, for each data message portion of the second plurality of data message portions, that the telephone call on the selected telephone line is not answered by the second party. The step of initiating preferably includes a step of initiating the telephone call using ISDN service and the step of ensuring includes a step of denying acceptance of an ISDN call connection message.

In an alternate embodiment, the present invention comprises a method of communicating a data message, defined by a message sender, from a message server serviced by a message server TELCO central office to a message recipient having message recipient terminal equipment serviced by a message recipient TELCO central office. The message recipient terminal equipment communicatively connects to the message recipient TELCO central office through a message recipient telephone line, and the message server TELCO central office and the message recipient TELCO central office communicatively connect through the public switched telecommunication network. The method comprises the steps of communicatively connecting the message server to the message server TELCO central office through a plurality of message server telephone lines and communicatively connecting the message server to the message recipient TELCO central office. The method further comprises the steps of: associating, at the message server, the data message with a telephone line of the plurality of message server telephone lines; selecting the telephone line associated with the data message from the remainder of the telephone lines of the plurality of message server telephone lines; and, initiating a telephone call, at the message server, to the message recipient using the selected telephone line. In response to initiating the telephone call using the selected telephone line, the method includes a step of receiving, at the message recipient TELCO central office from the message server, the data message associated with the selected telephone line. The method further includes a step of communicating the data message from the message recipient TELCO central office to the message recipient terminal equipment using the message recipient telephone line. The step of communicating occurs absent answering of the telephone call by the message recipient terminal equipment.

Because the method of the present invention enables communication of a data message without the establishment of a telephonic connection between a message sender's terminal equipment and a message recipient's terminal equipment, communication of the data message is faster (i.e., as no initiation of modem handshaking is required) and less expensive (i.e., as no charges are incurred for an unanswered telephone call) than if the data message were communicated by current methods. The increase in speed should enable faster response by police and/or fire personnel to emergency situations, while the decrease in cost should aid the financial bottom line for an individual or business.

Accordingly, it is an object of the present invention to enable fast, economical communication of a short data message between a calling party, or calling communication device, and a called party, or communication device, using the existing telecommunication infrastructure and capabilities thereof.

Another object of the present invention is to communicate a short data message between a calling party, or calling communication device, and a called party, or called communication device, without establishing a telecommunication connection.

Still another object of the present invention is to communicate a short data message between a calling party, or calling communication device, and a called party, or called communication device, during the time interval between the first and second ring signals on a telephone line which are generated in response to the placement of a telephone call to the called party, or called communication device, by the calling party, or calling communication device.

Still another object of the present invention is to communicate a short data message between a calling party, or calling communication device, and a called party, or called communication device, by employing existing calling number identification and/or calling name identification services.

Still another object of the present invention is to communicate a short data message, including alphanumeric characters, between a calling party, or calling communication device, and a called party, or called communication device.

Still another object of the present invention is to communicate a short data message, including alphanumeric characters, between a calling party, or calling communication device, and a called party, or called communication device, and to present the data message to the called party through a display device at the site of the called party or called communication device.

Still another object of the present invention is to communicate a short data message between a calling party, or calling communication device, and a called party, or called communication device, where the data message indicates the presence of a voice mail message awaiting delivery to the called party, or called communication device.

Still another object of the present invention is to communicate a short data message between a calling party, or calling communication device, and a called party, or called communication device, where the data message indicates the absence of a voice mail message awaiting delivery to the called party, or called communication device.

Still another object of the present invention is to communicate a short data message between a calling party, or calling communication device, and a called party, or called communication device, where the data message indicates the presence of electronic mail awaiting delivery to the called party, or called communication device.

Still another object of the present invention is to communicate a short data message between a calling party, or calling communication device, and a called party, or called communication device, where the data message indicates the absence of electronic mail awaiting delivery to the called party, or called communication device.

Still another object of the present invention is to communicate a short data message between a calling party, or calling communication device, and a called party, or called communication device, where the data message causes activation of a message waiting indicator at the site of the called party or the called communication device.

Other objects, features, and advantages of the present invention will become apparent upon reading and understanding the present specification when taken in conjunction with the appended drawings.

DETAILED DESCRIPTION OF THE PREFERRED EMBODIMENTS

Figure 1:
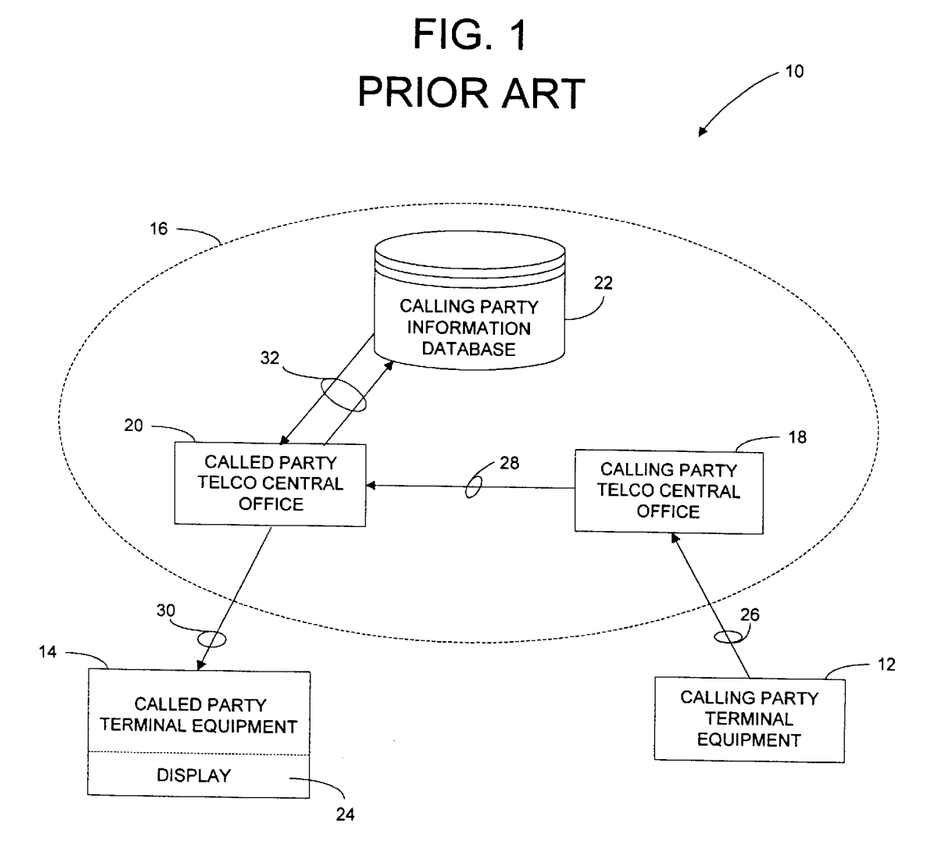
FIG. 1 is a block diagram representation of an apparatus of telecommunication components and connections which enable a calling name and/or calling number identification process of the prior art.

Referring now to the drawings, in which like numerals represent like components and/or steps through out the several views, FIG. 1 displays a prior art apparatus 10 of telecommunication components and connections necessary to enable the calling number/name identification services currently provided by a telephone company (i.e., also referred to herein as "TELCO") which supply, to a called party, the telephone number and/or name of a calling party prior to answering of a telephone call placed by the calling party to the called party. The prior art apparatus 10 of telecommunication components and connections comprises calling party terminal equipment 12, called party terminal equipment 14, and the public switched telephone network 16 (also referred to herein "PSTN" 16) communicatively connected therebetween. The PSTN 16 includes a calling party TELCO central office 18, a called party TELCO central office 20, and a calling party information database 22. The calling party terminal equipment 12 of FIG. 1 represents telecommunication equipment which is capable of initiating, or originating, a telephone call. The called party terminal equipment 14 of FIG. 1 represents telecommunication equipment capable of receiving a telephone call and has a display 24, or other apparatus functioning therewith, capable of presenting to the called party, the calling party identification information 38 (i.e., the telephone number assigned to a calling party telephone line 30 and/or the names of an individual, a business, etc. associated with the telephone line 30) stored in the calling party information database 22.

The calling party terminal equipment 12 connects, as seen in FIG. 1, to the calling party TELCO central office 18 (and, hence, to the PSTN 16) through calling party telephone line 26 which has a calling party telephone number associated therewith. The calling party TELCO central office 18 connects to the called party TELCO central office 20 via trunk 28. A called party telephone line 30, having a called party telephone number associated therewith, connects the called party terminal equipment 14 to the called party TELCO central office 20 and, hence, connects the called party telephone line 30 to the PSTN 16. The called party TELCO central office 20 connects to the calling party information database 22 through signal paths 32 in order to issue requests for calling party identification information 38 to the calling party information database 22 and to receive calling party identification information 38 from the calling party information database 22.

Figure 2:
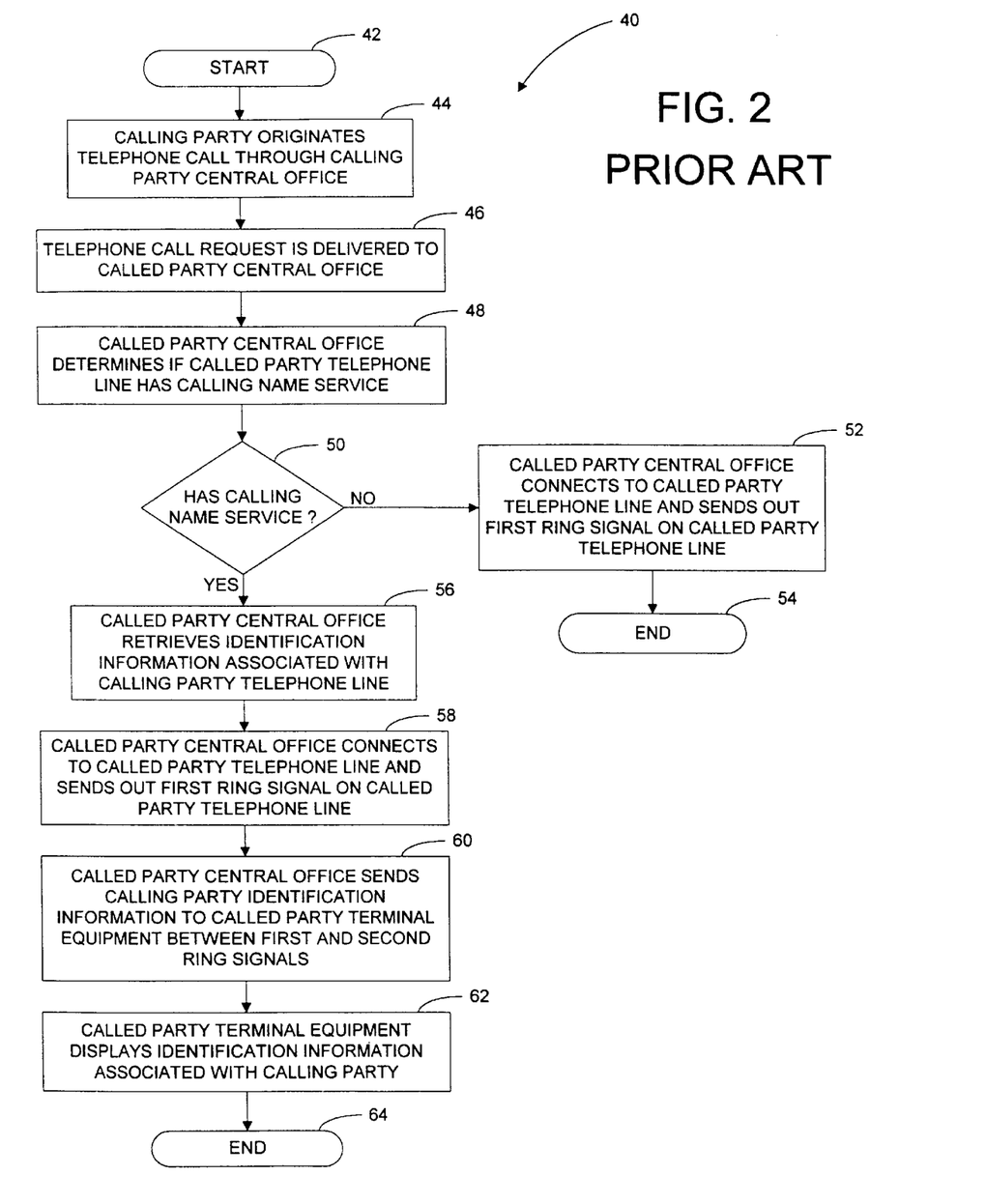
FIG. 2 is a flowchart representation of the calling name and/or calling number identification process of the prior art.

FIG. 2 displays the steps of a prior art calling party identification process 40 which operates in conjunction with the apparatus 10 described above to provide the telephone number and/or name of a calling party to a called party who subscribes to (i.e., pays for) a calling party identification service. After starting at step 42, the process 40 advances to step 44 where the calling party originates a telephone call, at terminal equipment 12, to a called party at terminal equipment 14 by causing terminal equipment 12 to go off-hook and by inputting the called party telephone number. In order to originate the telephone call, terminal equipment 12 establishes a telephonic connection using telephone line 26 and communicates the called party telephone number as part of a telephone call request to the calling party TELCO central office 18. Upon receiving the telephone call request, the calling party TELCO central office 18 delivers, at step 46, the telephone call request (also including the called party telephone number), via trunk 28, to the called party TELCO central office 20. The called party TELCO central office 20, after receiving the telephone call request, performs an investigation of the called party's profile (i.e., stored within the PSTN 16) using the called party telephone number, at step 48, to determine whether the called party (and, hence, the called party telephone line 30) subscribes to calling party identification service. If the called party telephone line 30 does not subscribe to calling party identification service, the calling party identification process 40 branches, at step 50, to step 52 where the called party TELCO central office 20 connects to the called party terminal equipment 14, via telephone line 30, and sends out a first ring signal to terminal equipment 14. Since no calling party identification information 38 is provided to the called party terminal equipment 14, the calling party identification process 40 ends at step 54.

Figure 3:
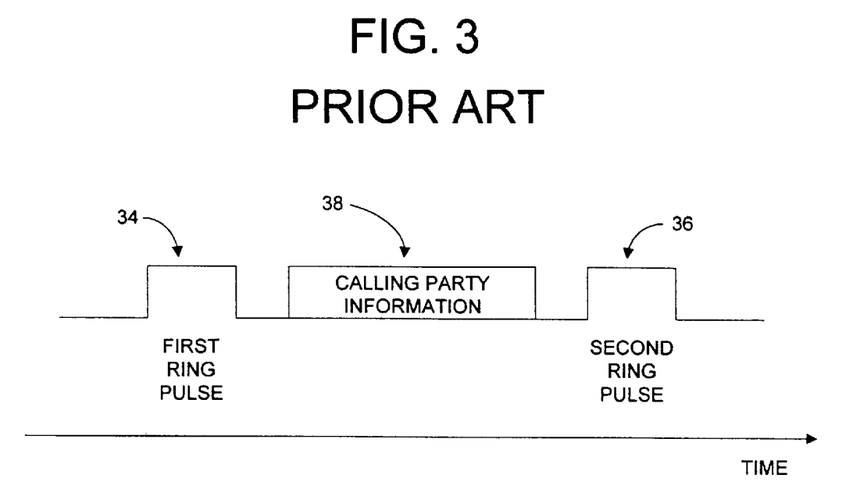
FIG. 3 is a timeline, pictorial representation of ring signals and data communicated to called terminal equipment during operation of the calling name and/or calling number identification process of the prior art.

If, at step 48, it is determined that the called party (and, hence, the called party telephone line 30) subscribes to calling party identification service, the calling party identification process 40 branches, at step 50, to a portion of the process 40 which presents calling party identification information 38 to the called party at terminal equipment 14. Upon branching, the called party TELCO central office 20 retrieves, at step 56, the calling party identification information 38 associated with the calling party telephone line 26 from the calling name database 22 through inter-network signal paths 32. Then, at step 58, the called party TELCO central office 20 connects to the called party terminal equipment 14 using called party telephone line 30 and sends out a first ring signal 34, or pulse, (see FIG. 3) over the line 30. After communication of the first ring signal 34 and before communication of a second ring signal, or pulse, 36, the called party TELCO central office 20 communicates the calling party identification information 38 (see FIG. 3), retrieved from the calling party information database 22 at step 56, to the called party terminal equipment 14 at step 60. Upon receipt of the calling party identification information 38 associated with the calling party, the called party terminal equipment 14 presents the calling party identification information 38 on display 24 at step 62. The calling part) identification process 40 then ends at step 64 with or without the called party terminal equipment going off-hook (and, hence, with or without a telephonic connection being established between the calling party terminal equipment 12 and the called party terminal equipment 14).

Figure 4:
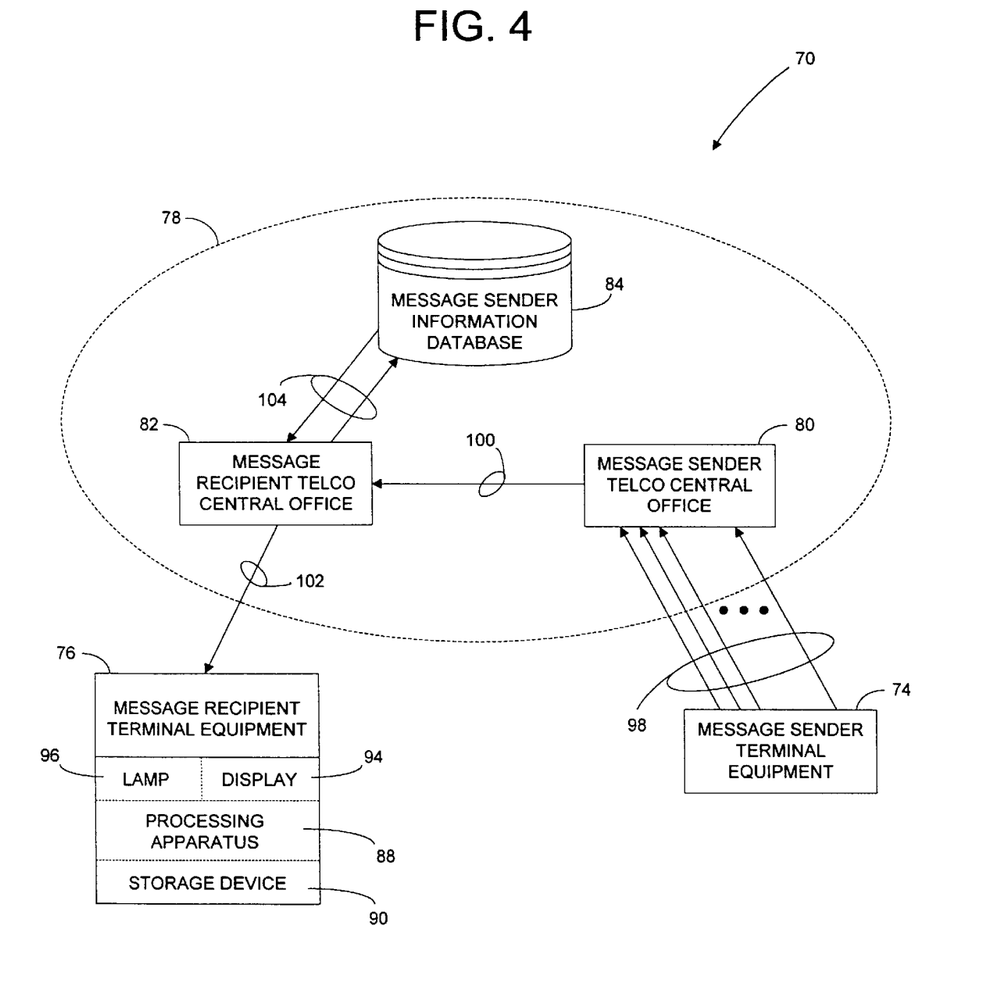
FIG. 4 is a block diagram representation of an apparatus of telecommunication components and connections which enable a data messaging process in accordance with a preferred embodiment of the present invention.

FIG. 4 illustrates a data messaging apparatus 70 comprising telecommunication components and connections necessary to enable operation of a data messaging process 72, according to the first preferred embodiment of the present invention, which communicates a short data message 160 (see FIG. 6C for a sample data message) to a message recipient (i.e., actually a "called party" who receives a short data message 160) upon instigation of the data messaging process 72 by a message sender (i.e., actually a "calling party" who sends a short data message 160). The data messaging apparatus 70 comprises message sender terminal equipment 74 located at the message sender's site, message recipient terminal equipment 76 located at the message recipient's site, and the public switched telephone network 78 (also referred to herein "PSTN" 78) communicatively connected therebetween. The PSTN 78 includes a message sender TELCO central office 80, a message recipient TELCO central office 82, and a message sender information database 84 which stores message sender identification information (i.e., the telephone number assigned to a message sender telephone line 98 and the name of an individual, a business, etc. associated with, and indexed by, the telephone number (described below) in a substantially similar manner to the calling party information database 22 of the prior art apparatus).

The message sender terminal equipment 74 of FIG. 4 represents telecommunication equipment which is capable, at least, of initiating, or originating, a telephone call, and includes, but is not limited to, a conventional telephone, a telephone system, a modem, an apparatus which emulates the functions of a telephone, etc. The message recipient terminal equipment 76 of FIG. 4 represents telecommunication equipment capable, at least, of receiving a telephone call (i.e., including, but not limited to, a telephone, a telephone system, a modem, an apparatus which emulates the functions of a telephone, etc.). The message recipient terminal equipment 76 includes, according to the preferred embodiment, a processing apparatus 88 communicable and operable with a storage device 90 (i.e., which non-volatively stores short data messages 160 associated with and indexed by, in one-to-one correspondence, a telephone number of a message sender telephone line 98) and with an input device capable of receiving short data messages 160 and telephone numbers of message sender telephone lines 98. The message recipient terminal equipment 76 also comprises a display 94 capable of communicating and operating with the processing apparatus 88 in order to present, to the message recipient, short data messages 160 and/or message sender identification information 86 assigned to a message sender telephone line 98. The short data messages 160 include, at least, textual characters or signals which indicate the presence and/or absence of a voice mail message(s), an e-mail message(s), etc. awaiting delivery to a message recipient. The message recipient terminal equipment 76 further includes, according to the preferred embodiment, a lamp 96 (also referred to herein as a message waiting indicator 96) communicable and operable with the processing apparatus 88 which is visible to a user of the message recipient terminal equipment 76 and which indicates the presence, when on, of a voice mail message, an e-mail message, etc. awaiting delivery to a message recipient and which indicates the absence, when off, of a voice mail message, an e-mail message, etc. awaiting delivery to a message recipient.

The message sender terminal equipment 74 connects, as seen in FIG. 4, to the message sender TELCO central office 80 (and, hence, to the PSTN 78) through a plurality of message sender telephone lines 98 which each have a message sender telephone number uniquely associated therewith. The message sender TELCO central office 80 connects to the message recipient TELCO central office 82 via trunk 100. A message recipient telephone line 102, having a message recipient telephone number associated therewith, connects the message recipient terminal equipment 76 to the message recipient TELCO central office 82 and, hence, connects the message recipient telephone line 102 to the PSTN 78. Note that telephone lines 98, 102 represent any, and all, types of telecommunication links (including, but not limited to, land lines, cellular links, radio links, etc., composites thereof, and equipment associated therewith) between the message sender and message recipient terminal equipment 74, 76 and their respective TELCO central offices 80, 82. The message recipient TELCO central office 82 connects to the message sender information database 84 through signal paths 104 in order to issue requests for message sender identification information 86 to the message sender information database 84 and to receive message sender identification information 86 from the message sender information database 84.

Figure 5A:
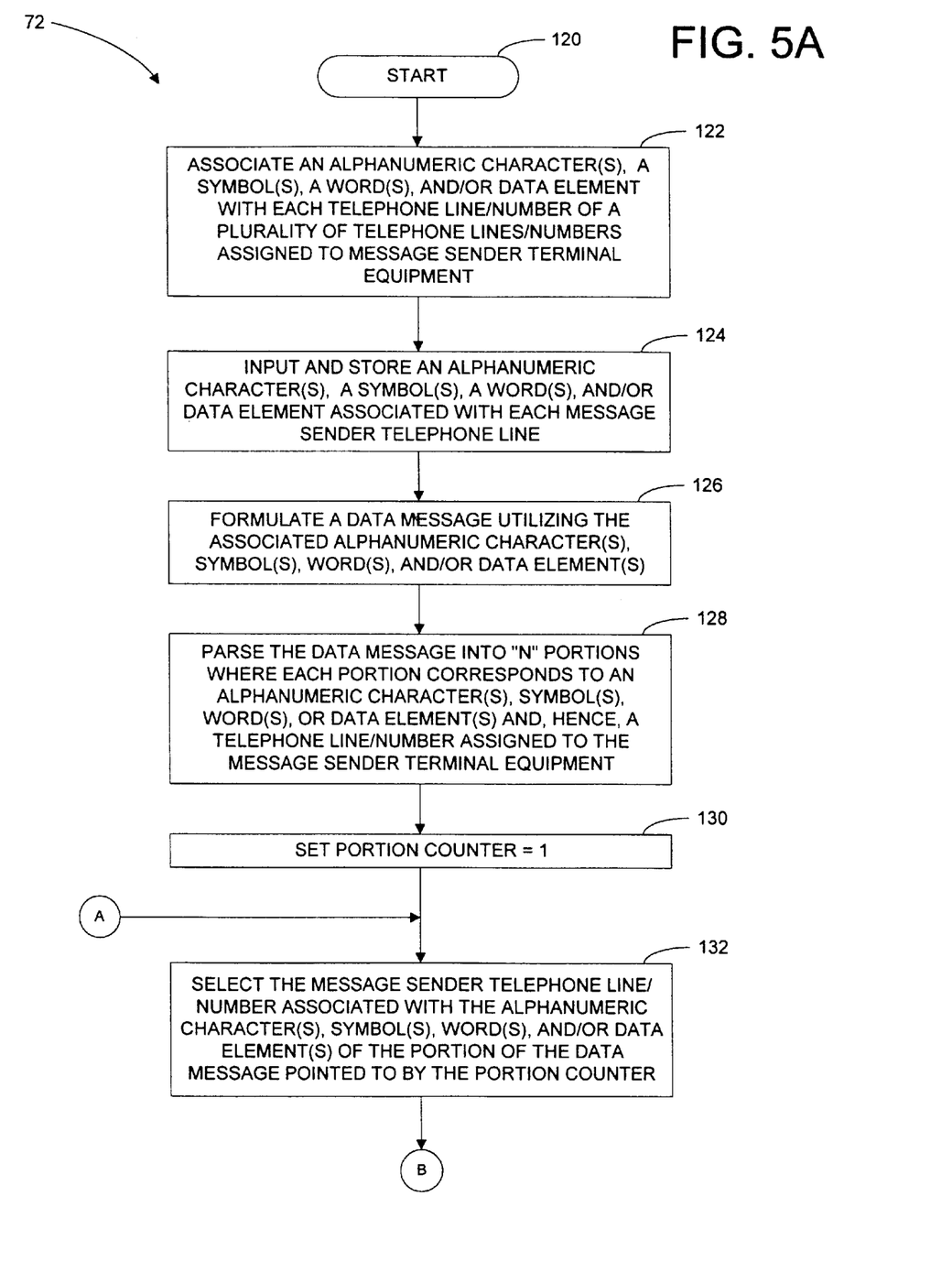
FIG. 5 is a flowchart representation of a data messaging process in accordance with the preferred embodiment of the present invention.
Figure 5B:
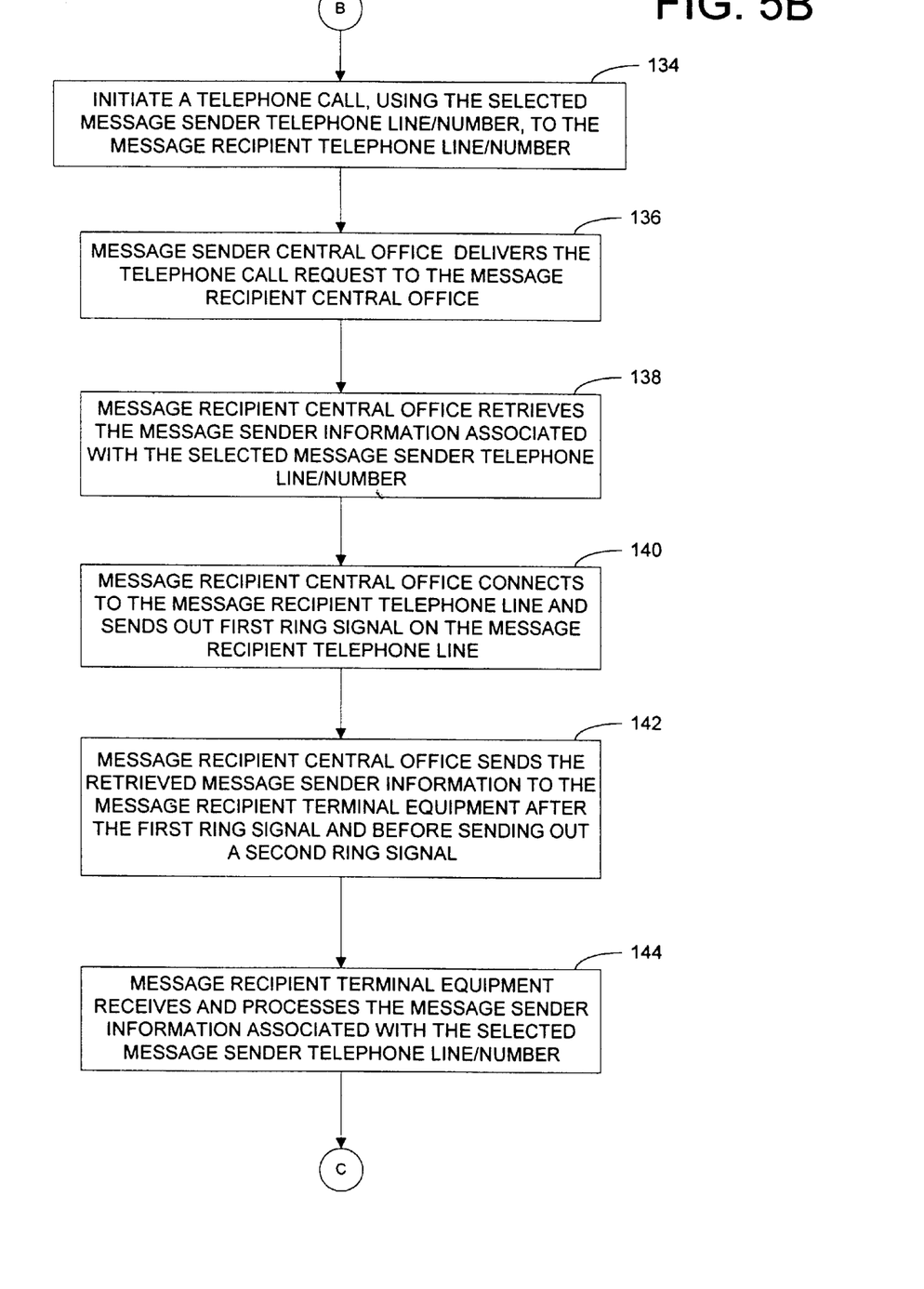
Figure 5C:
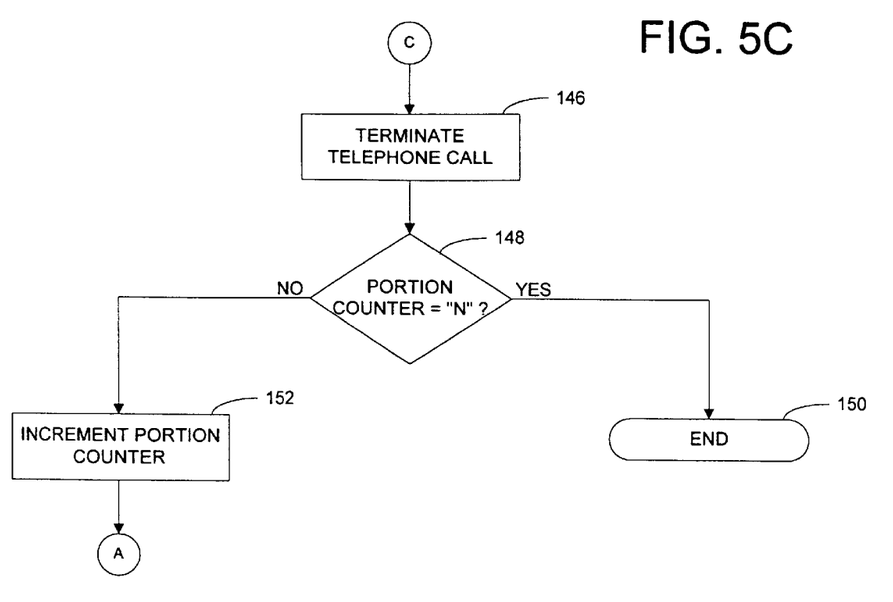
Figure 6A:
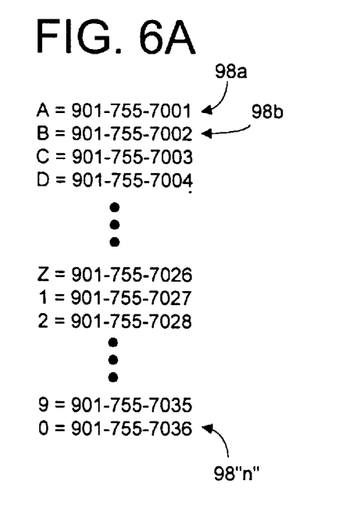
FIG. 6A is a pictorial representation showing one-to-one association of alphanumeric characters with a message sender telephone line/number in accordance with the preferred embodiment of the present invention.
Figure 6B:
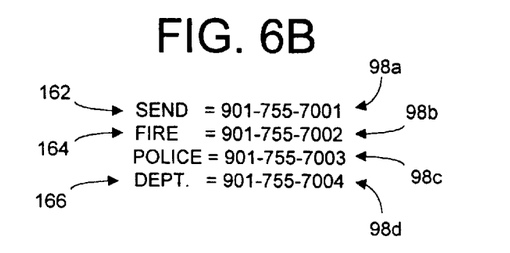
FIG. 6B is a pictorial representation showing one-to-one association of words with a message sender telephone line/number in accordance with the preferred embodiment of the present invention.

In accordance with a method of the preferred embodiment of the present invention, FIG. 5 displays the steps of a data messaging process 72 which enables the communication of a short data message 160 between a message sender and a message recipient absent answering, by the message recipient, of a telephone call therebetween. After starting at step 120, an alphanumeric character, a symbol, a word, and/or a data element is uniquely associated, at step 122, with each telephone line (and, hence, with each telephone number due to the unique association between each telephone line and each telephone number) of the plurality of message sender telephone lines 98 (see FIGS. 6A, 6B). Such association creates a one-to-one correspondence between an alphanumeric character, a symbol, a word, and/or a data element and a respective message sender telephone line 98 which enables subsequent identification (i.e., by cross-referencing) of the associated alphanumeric character, symbol, word and/or data element upon identification of the message sender telephone line 98 on which a telephone call is placed to a message recipient by a message sender. Note that both the message sender and the message recipient are aware, prior to any attempt at message communication, of the associations, or relationships, between the alphanumeric characters, symbols, words, and/or data elements and the respective message sender telephone lines 98. Then, at step 124, the alphanumeric character, symbol, word and/or data element associated with each message sender telephone line 98 is input to the message recipient terminal equipment 76 using input device 92 and is stored in storage device 90 using the telephone number of the message sender telephone line 98 as an index, or identifier.

At step 126, a message sender formulates a short data message 160 utilizing an alphanumeric character(s), symbol (s), word(s), and/or data element(s) stored in storage device 90. Continuing at step 128, the short data message 160 is parsed into "N" portions where each portion corresponds to a stored alphanumeric character, symbol, word, or data element associated with a message sender telephone line 98. A counter (also referred to herein as a "portion counter") identifies the number of portions of the short data message 160 processed and is initialized, at step 130, to one (1). Then, at step 132, the message sender telephone line 98 associated with the alphanumeric character, symbol, word and/or data element of the portion of the short data message 160 currently being processed and pointed to by the portion counter is selected and placed in an off-hook condition by the message sender terminal equipment 74. A telephone call is initiated at the message sender terminal equipment 74, using the selected message sender telephone line 98, to the message recipient telephone line 102 at step 134 by inputting of the telephone number of the message recipient telephone line 102. Upon detecting the off-hook condition and the input of the telephone number of the message recipient telephone line 102, the message sender TELCO central office 80 delivers, at step 136, a telephone call request to the message recipient TELCO central office 82 via trunk 100. The telephone call request includes the telephone number associated with the selected message sender telephone line 98 and the telephone number associated with the message recipient telephone line 102.

Figure 7:
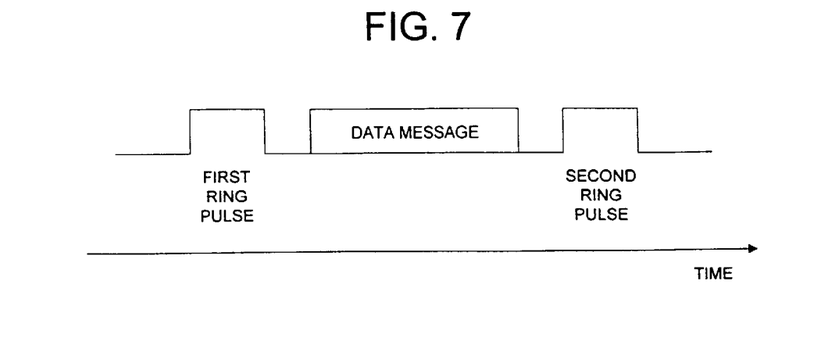
FIG. 7 is a timeline, pictorial representation of ring signals and data communicated to message recipient terminal equipment according to the preferred embodiment of the present invention.

Upon receiving delivery of the telephone call request, the message recipient TELCO central office 82 retrieves, at step 138, the message sender identification information 86 from the message sender information database 84 via signal paths 104. At step 140, the message recipient TELCO central office 82 connects to the message recipient telephone line 102 and sends out a first ring signal, or pulse, on the line 102. Then, at step 142, the message recipient central office 82 sends the message sender identification information 86 with the telephone number associated with the selected message sender telephone line 98 to the message recipient terminal equipment 76 after the first ring signal, but before sending of a second ring signal, or pulse (see FIG. 7). The message recipient terminal equipment 76 receives and appropriately processes the message sender identification information 86 and the telephone number associated with the selected message sender telephone line 98 through operation of processing apparatus 88 at step 144. Appropriate processing includes looking-up and retrieving the alphanumeric character, symbol, word, and/or data element associated with the selected message sender telephone line 98 (i.e., by using the telephone number associated with the selected message sender telephone line 98 as an index to locate, or cross-reference to, the previously associated alphanumeric character, symbol, word, and/or data element which was previously stored in storage device 90) and visibly presenting it on display 94. Appropriate processing also includes similarly looking-up and retrieving the alphanumeric character, symbol, word, and/or data element associated with the selected message sender telephone line 98 and turning-on/turning-off lamp 96 based upon the particular alphanumeric character, symbol, word, and/or data element so retrieved (i.e., to indicate, for example, the presence/absence of voice mail, e-mail, etc. awaiting delivery to the message recipient).

Continuing at step 146, the telephone call placed from the message sender terminal equipment 74 is terminated prior to and absent answering of the telephone call by the message recipient terminal equipment 76 after two ring pulses have been communicated to the message recipient terminal equipment 76. Note that not answering of the telephone call is mutually agreed upon, in advance, by the message sender and message recipient or the message recipient terminal equipment 76 is configured not to answer the incoming telephone call. At step 148, the data messaging process 72 determines whether the portion counter is equal to "N" (and, hence, whether all portions of the short data message 160 have been processed). If so, the data messaging process 72 ends at step 150. If not, the data messaging process 72 branches to step 152 where the portion counter is incremented. The data messaging process 72 then loops back to step 132 where a message sender telephone line 98 associated with the next portion of the short data message 160 is selected for the placement of a telephone call from the message sender terminal equipment 74.

To better illustrate and describe the operation of the data messaging process 72, consider communication of the short data message 160 (see FIG. 6C) from a message sender to a message recipient. The sample short data message 160 comprises a first portion 162 including the word "SEND", a second portion 164 including the word "FIRE", and a third portion 166 including the word "DEPT." and is sent by a building protection system (i.e., the message sender terminal equipment 74) to a county emergency response system (i.e., the message recipient terminal equipment 76). The message sender terminal equipment 74 has four message sender telephone lines 98 connected and available thereto (see FIG. 6B) which have four unique telephone numbers and four unique words associated therewith (i.e., 901-755-7001 is associated with the first message sender telephone line 98a and the word "SEND", 901-755-7002 is associated with the second message sender telephone line 98b and the word "FIRE", 901-755-7003 is associated with the third message sender telephone line 98c, and 901-755-7004 is associated with the fourth message sender telephone line 98d and the word, or abbreviation, "DEPT.").

Figure 6C:
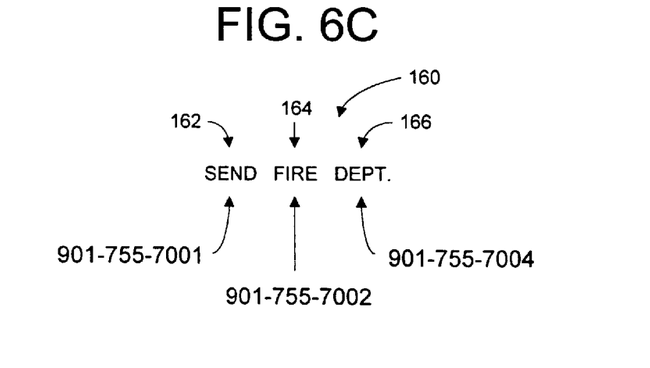
FIG. 6C is a pictorial representation of a short data message in accordance with the preferred embodiment of the present invention.

Upon detection of a fire, the building protection system (i.e., the message sender terminal equipment 74) desires to send the short data message 160 (i.e., "SEND FIRE DEPT.") to the county emergency response system (i.e., the message recipient terminal equipment 76). The message sender terminal equipment 74 parses the short data message 160 into the words "SEND", "FIRE", and "DEPT." (i.e., portions 162, 164, 166 of the short data message 160) which are each uniquely associated with message sender telephone lines 98a, 98b, 98d. Then, the message sender terminal equipment 74 successively places three separate telephone calls (e.g., with successive telephone calls being placed after termination of the previous telephone call upon detection of the sending of a second ring pulse to the message recipient terminal equipment 76) using the message sender telephone lines 98 selected in the order necessary to enable correct recreation of the short data message 160 at the message recipient terminal equipment 76. The message recipient terminal equipment 76 receives the ring pulses associated with the three separate telephone calls and the telephone numbers corresponding to the selected message sender telephone lines 98, but does not answer the telephone calls. Then, the message recipient terminal equipment 76, using the telephone numbers, looks-up the portions 162, 164, 166 of the message 160 corresponding to the telephone numbers which have been previously stored in storage device 90 and presents them on display 94 to county emergency response personnel, thereby instructing the dispatch of fire department personnel and equipment to the building.

It is understood that the scope of the present invention comprises short data messages 160 which include signals, or code words, representative of various states or conditions and signals, or code words, representative of various actions to be taken upon receipt of the signals or codes. For example, a short data message 160 containing a signal, or code, is employable to turn-on/turn-off a message waiting indicator at the message recipient terminal equipment 76.

In a first alternate embodiment of the present invention, the message sender telephone lines 98 utilize ISDN service and enable denying acceptance, by the message sender, of any call connection messages related to telephone calls placed by the message sender terminal equipment 74 in order to ensure that such telephone calls are not answered by the message recipient terminal equipment 76.

In a second alternate embodiment of the present invention, a data messaging apparatus comprises telecommunication components and connections substantially similar to those telecommunication components and connections of the prior art (see FIG. 1) and further comprises a plurality of calling party telephone lines substantially similar to those message sender telephone lines 98 of the preferred embodiment. Employing a data messaging process substantially similar to data messaging process 72 of the preferred embodiment, the telephone number of each calling party telephone line is uniquely associated with an alphanumeric character(s), symbol(s), word(s), and/or data element(s) which is stored as calling party identification information indexed, or cross-referenced, by the telephone number of each calling party telephone line (i.e., substantially similar to the way that a name is associated and stored for a calling party telephone line 26 in the prior art) and stored in a calling party identification information database (i.e., substantially similar to database 22 of the prior art). Thereafter, the data messaging process communicates a short data message from a calling party to a called party using a necessary number of telephone calls in substantially the same manner as that of data messaging process 72 of the preferred embodiment, except that no retrieval of data message portions is done at called party terminal equipment. Instead, the called party TELCO central office performs the retrieval of data message portions from the calling party identification information database as if, like in the prior art, it is retrieving called party identification information 38 from a calling party information database 22. The called party TELCO central office then communicates the data message portions to the called party terminal equipment between first and second ring signals for presentation on a connected display (i.e., note that the called party terminal equipment and display are substantially similar to the called party terminal equipment 14 and display 24 of the prior art).

Figure 8:
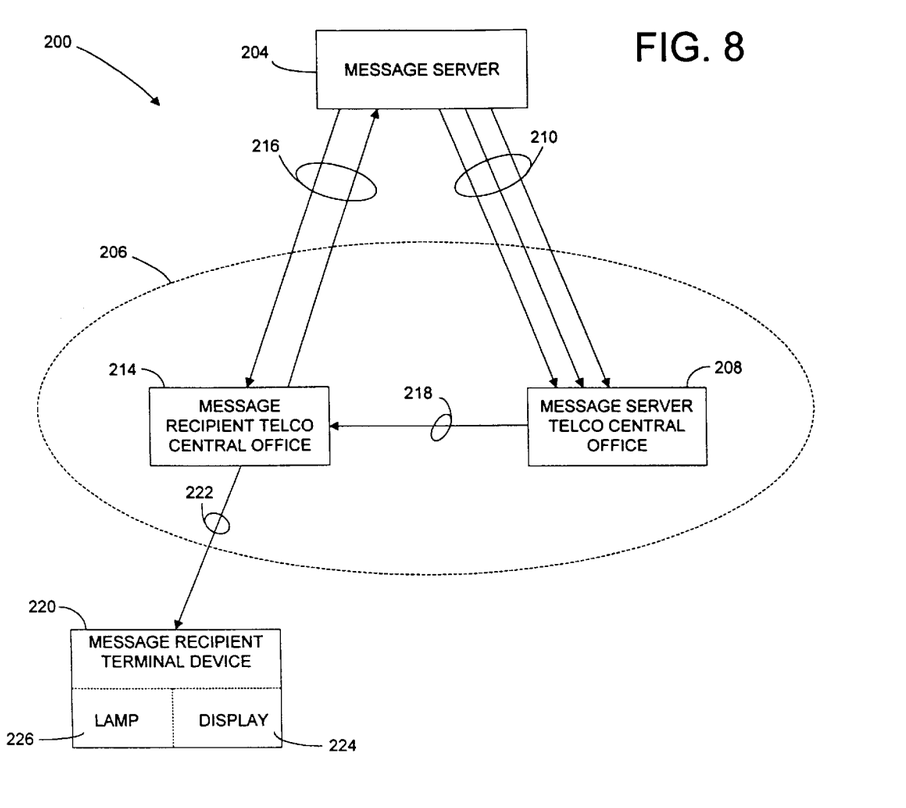
FIG. 8 is block diagram representation of an apparatus of telecommunication components and connections which enable a data messaging process of a third alternate embodiment of the present invention.

FIG. 8 displays a data messaging apparatus 200, according to a third alternate embodiment of the present invention, comprising telecommunication components and connections necessary to enable operation of a data messaging process 202. The data messaging apparatus 200 comprises a message server 204 which resides outside of the Public Switched Telephone Network 206 (also referred to herein as "PSTN" 206) and delivers data messages to message recipients through interaction with the PSTN 206. Preferably, the message server 204 has a central processing unit capable of executing a software program and of making logical decisions, a storage device capable of storing an association of a data message and a telephone line (and, hence, an association of a data message and a telephone number assigned to the telephone line), and a telecommunications interface to enable communication with various components of the PSTN 206. The message server 204 communicatively connects to a message server TELCO central office 208 through a plurality of message server telephone lines 210 in trunk 212 which, preferably, provide ISDN service (i.e., thereby enabling the message server 204 to control, and deny, answering of telephone calls placed by the message server 204 in order to deliver data messages). The message server 204 also communicatively connects to a message recipient TELCO central office 214 through communication links 216. A trunk 218 communicatively connects the message server TELCO central office 208 and the message recipient TELCO central office 214. Message recipient terminal equipment 220 communicatively connects to the message recipient TELCO central office 214 via message recipient telephone line 222. Preferably, calling name service, described above with respect to FIG. 2, is operable for the message recipient telephone line 222.

The message recipient terminal equipment 220 represents telecommunication equipment capable, at least, of receiving a telephone call (i.e., including, but not limited to, a telephone, a telephone system, a modem, an apparatus which emulates the functions of a telephone, etc.). The message recipient terminal equipment 220 includes, according to the third alternate embodiment, a display 224 capable of presenting textual information, received from the message recipient TELCO central office 214 through line 222, to a message recipient using the message recipient terminal equipment 220. The message recipient terminal equipment 220 further includes a lamp 226 (also referred to herein as a message waiting indicator 226) capable of being turned-on and turned-off by information received from the message recipient TELCO central office 214. Note that, as configured in the third alternate embodiment, the message server 204 appears to, and interacts with, the message recipient TELCO central office 214 as if it were a calling party information database 22 (see FIG. 1) and as if it were calling party terminal equipment 12 (see FIG. 1). Note also that, in an alternate embodiment, the message server 204 resides within the PSTN 206.

Figure 9A:
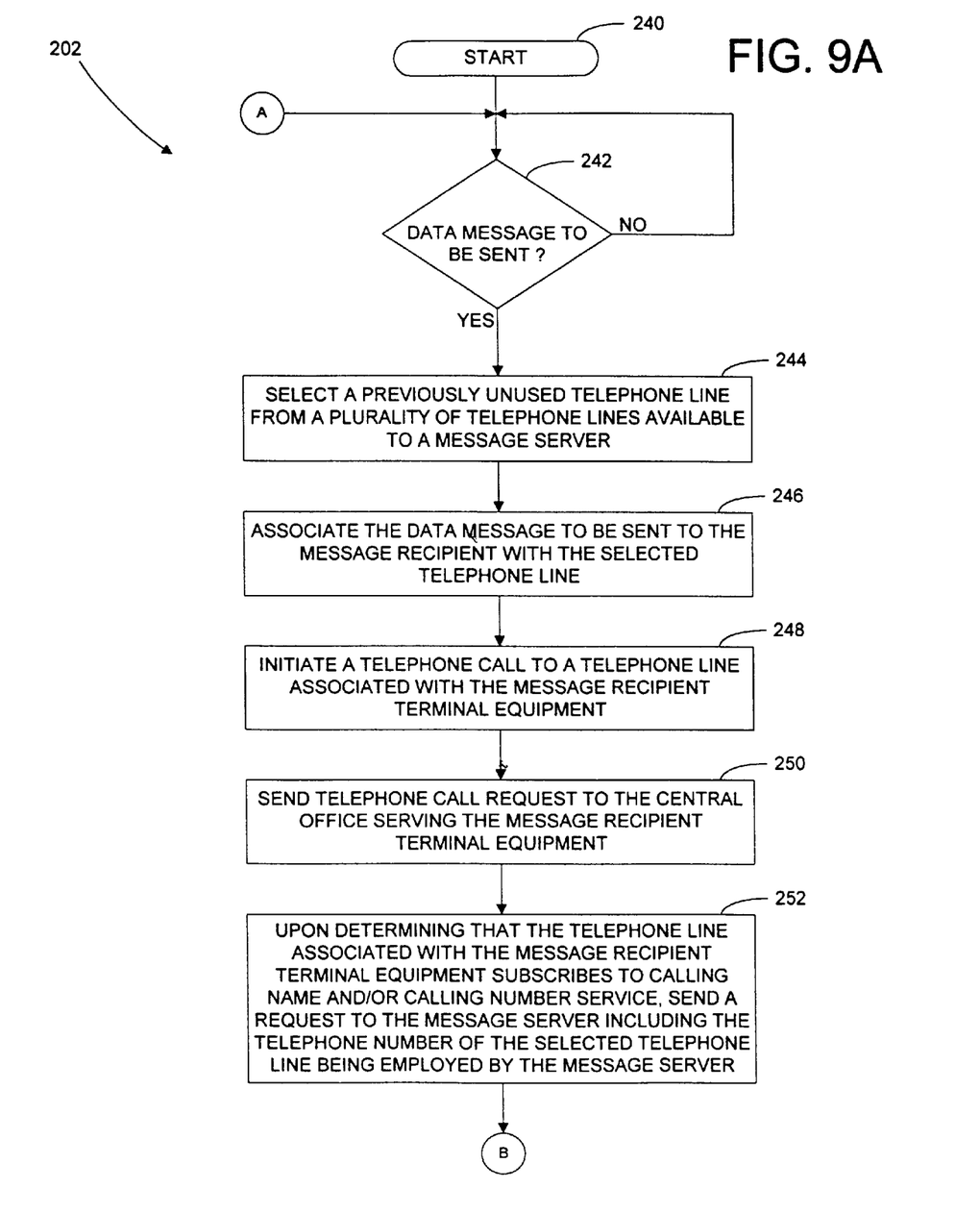
FIG. 9 is a flowchart representation of a data messaging process in accordance with the third alternate embodiment of the present invention.
Figure 9B:
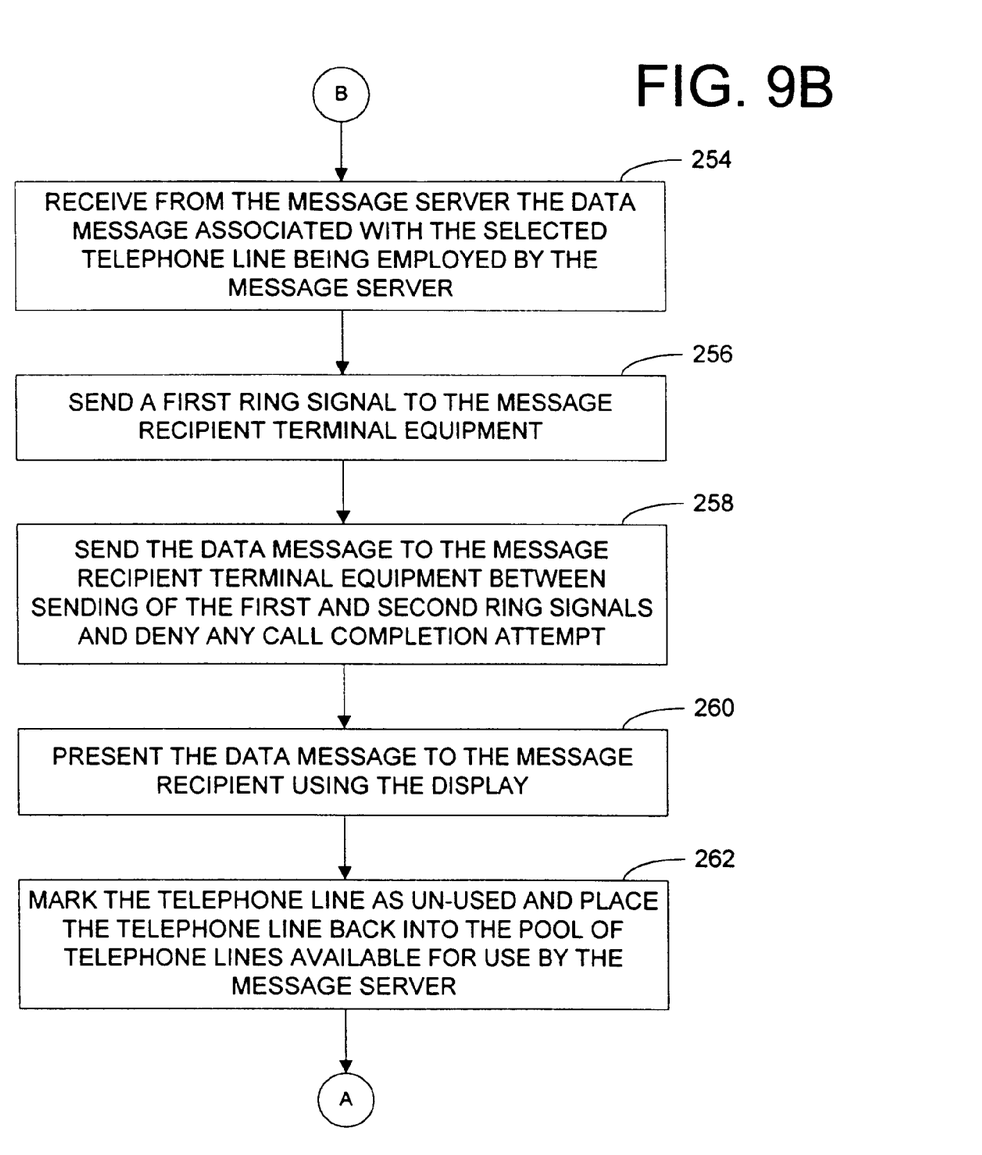

In accordance with a method of the third alternate embodiment of the present invention, FIG. 9 displays the steps of a data messaging process 202 which enables the communication of a data message between the message server 204 and a message recipient absent answering, by the message recipient, of a telephone call therebetween. After starting at step 240, the data messaging process 202 advances to step 242 where the message server 204 determines whether a data message is awaiting delivery from the message server 204 to a message recipient. If not, the process 202 loops back to continue looking for the presence of a data message requiring delivery. If so, the process 202 continues, at step 244, where the message server 204 selects an available message server telephone line 210 from trunk 212 (i.e., some of the message server telephone lines 210 may already be in use by the message server 204 to deliver other data messages to other message recipients). Then, at step 246, the message server 204 associates the data message to be sent with the telephone number assigned to the selected telephone line 210. The message server 204 initiates, at step 248, a telephone call to the message recipient terminal equipment 220 by directing its telecommunication interface to cause the selected telephone line 210 to go off-hook and by outputting the telephone number assigned to the message recipient telephone line 222 via the telecommunication interface. Upon detecting that the selected telephone line 210 is off-hook and upon receiving the telephone number assigned to the message recipient telephone line 222, the message server TELCO central office 208 issues, at step 250, a telephone call request, including the telephone number assigned to the message recipient telephone line 222 and the telephone assigned to the selected message server telephone line 210, to the message recipient TELCO central office 214 via trunk 218.

Continuing at step 252, the message recipient TELCO central office 214 communicates a request for calling party name identification information to the message server 204 through communication links 216 upon ascertaining that the message recipient telephone line 222 subscribes to calling party identification service. The request includes the telephone number assigned to the selected message server telephone line 210. Responding to the request for calling party identification information, the message server 204 retrieves the data message previously associated with the telephone number of the selected message server telephone line 210 from its storage device. Then, at step 254, the message server 204 sends the data message to the message recipient TELCO central office 214 which receives the data message. At step 256, the message recipient TELCO central office 214 sends a first ring signal, or pulse, to the message recipient terminal equipment 220 through message recipient telephone line 222. Next, at step 258, the message recipient TELCO central office 214 sends the data message to the message recipient terminal equipment 220, via line 222, before sending a second ring signal, or pulse, to the message recipient terminal equipment 220. Preferably, the message server 204, using ISDN capabilities, denies any attempt at completing the telephone call by answering of the call at the message recipient terminal equipment 220. The message recipient terminal equipment 220 receives the data message and, at step 260, presents the data message to the message recipient on display 224 or turns-on/turns-off lamp 226 based upon the content of the data message. Having delivered the data message to the message recipient, the message server 204, at step 262, marks the selected telephone line 210 as un-used, thereby making the selected telephone line 210 available for use in delivering another data message. The data messaging process 202 then loops back to step 242 to determine whether another data message is awaiting delivery to a message recipient.

Whereas this invention has been described in detail with particular reference to its preferred embodiment and alternate embodiments, it is understood that variations and modifications can be effected within the spirit and scope of the invention, as described herein before and as defined in the appended claims. The corresponding structures, materials, acts, and equivalents of all means and/or step plus function elements in the claims below are intended to include any structure, material, or acts for performing the functions in combination with other claimed elements as specifically claimed.

I claim:

1. A method of communicating a user-definable data message between a first party having telephone terminal equipment and a plurality of telephone lines associated therewith and a second party having telephone terminal equipment and a telephone line associated therewith, wherein the telephone lines of the first party and the second party are selectively connectable for communication therebetween through the public switched telecommunication network, the method comprising the steps of:

associating a first plurality of data message portions in one-to-one correspondence with the plurality of telephone lines of the first party;

parsing the data message into a second plurality of data message portions wherein the second plurality of data message portions comprises data message portions of the first plurality of data message portions; and, for each data message portion of the second plurality of data message portions, performing the steps of selecting a telephone line of the plurality of telephone lines of the first party wherein the selected telephone line is associated with a data message portion of the first plurality of data message portions which matches the data message portion of the second plurality of data message portions, initiating a telephone call to the telephone line of the second party employing the selected telephone line of the first party, receiving from the public switched telephone network information identifying the selected telephone line of the first party, determining the data message portion of the first plurality of data message portions corresponding to the selected telephone line of the plurality of telephone lines of the first party using, at least, the information identifying the selected telephone line of the first party, and wherein performance of the steps of receiving and determining occur absent answering of the telephone call by the second party;

whereby a data message comprising a plurality of data message portions is communicated between a first party and a second party.

2. The method of claim 1 wherein the method further comprises a step of presenting the data message portion determined by the step of determining to the second party.

3. The method of claim 1 wherein the method further comprises a step of storing in a data storage device information representing the one-to-one associations of the data message portions of the first plurality of data message portions with the telephone lines of the plurality of telephone lines of the first party, and wherein the step of determining comprises a step of retrieving from the data storage device the data message portion of the first plurality of data message portions based upon, at least, the information identifying the selected telephone line of the first party.

4. The method of claim 1 wherein the method further comprises a step of ensuring that the telephone call is not answered by the second party.

5. The method of claim 4 wherein the step of initiating comprises a step of initiating the telephone call using ISDN service and the step of ensuring comprises a step of denying acceptance of an ISDN call connection message.

6. The method of claim 1 wherein the method further comprises a step of outputting the ascertained data message to a display device associated with the telephone terminal equipment of the second party.

7. The method of claim 1 wherein the method further comprises a step of activating a message waiting indicator of the telephone terminal equipment of the second party.

8. The method of claim 1 wherein the method further comprises a step of, after receiving information identifying the telephone line of the first party, outputting information identifying the telephone line of the first party on the telephone line of the second party.

9. The method of claim 8 wherein the method further comprises the steps of transmitting a first ring signal on the telephone line of the second party and transmitting a second ring signal on the telephone line of the second party, and the step of outputting occurs between the steps of transmitting.

10. The method of claim 1 wherein the step of determining comprises a step of retrieving from a data storage device the data message associated with the telephone line of the first party.

11. The method of claim 1 wherein the data message indicates the presence of a voice mail message awaiting delivery to the second party.

12. The method of claim 11 wherein the data message indicates the absence of a voice mail message awaiting delivery to the second party.

13. The method of claim 1 wherein the data message indicates the presence of electronic mail awaiting delivery to the second party.

14. The method of claim 13 wherein the data message indicates the absence of electronic mail awaiting delivery to the second party.

15. A method of communicating a data message defined by a message sender from a message server serviced by a message server TELCO central office to a message recipient having message recipient terminal equipment serviced by a message recipient TELCO central office, wherein the message recipient terminal equipment communicatively connects to the message recipient TELCO central office through a message recipient telephone line, and the message server TELCO central office and the message recipient TELCO central office communicatively connect through the public switched telecommunication network, the method comprising the steps of:

communicatively connecting the message server to the message server TELCO central office through a plurality of message server telephone lines;

communicatively connecting the message server to the message recipient TELCO central office;

associating at the message server the data message with a telephone line of the plurality of message server telephone lines;

selecting the telephone line associated with the data message from the remainder of the telephone lines of the plurality of message server telephone lines;

initiating a telephone call at the message server to the message recipient using the selected telephone line of the plurality of message server telephone lines;

in response to initiating the telephone call using the selected telephone line, receiving at the message recipient TELCO central office from the message server the data message associated with the selected telephone line; and, communicating the data message from the message recipient TELCO central office to the message recipient terminal equipment using the message recipient telephone line.

16. The method of claim 15 wherein the method further comprises the steps of, after the step of initiating and before the step of receiving, detecting at the message server TELCO central office initiation of the telephone call, delivering a telephone call request from the message server TELCO central office to the message recipient TELCO central office, wherein the telephone call request includes information identifying the selected telephone line, and issuing a data message request from the message recipient TELCO central office to the message server requesting delivery of the data message to the message recipient TELCO central office, wherein the data message request includes the information identifying the selected telephone line.

17. The method of claim 15 wherein the step of communicating comprises the steps of sending a first ring signal from the message recipient TELCO central office to the message recipient terminal equipment, sending a second ring signal from the message recipient TELCO central office to the message recipient terminal equipment, and sending the data message from the message recipient TELCO central office to the message recipient terminal equipment between the first and second ring signals.

* * * * *